United States Patent [19]
Borel

[11] 4,344,657
[45] Aug. 17, 1982

[54] AXIAL/ROTARY GUIDE ELEMENT

[75] Inventor: Denis Borel, Matzingen, Switzerland

[73] Assignee: SRO Kugellagerwerke J. Schmid-Roost AG, Switzerland

[21] Appl. No.: 107,544

[22] Filed: Dec. 27, 1979

[30] Foreign Application Priority Data

Dec. 31, 1978 [CH] Switzerland ............... 13265/78

[51] Int. Cl.³ ............................................ F16C 29/06
[52] U.S. Cl. .................................................. 308/6 C
[58] Field of Search ................. 308/6 C, 6 A, 6 B, 7

[56] References Cited

U.S. PATENT DOCUMENTS

3,762,781  10/1973  Zeldman ........................ 308/6 C
4,181,374   1/1980  Ernst et al. ..................... 308/6 C

FOREIGN PATENT DOCUMENTS

2053636  4/1972  Fed. Rep. of Germany ...... 308/6 C

*Primary Examiner*—John W. Shepperd

[57] ABSTRACT

A guide element for translational and rotational movements of a shaft comprises an external sleeve 1 and a casing 2 containing closed circulation circuits 4 in which ball-bearings 6 and 7 move. The sleeve 1 has a continuous bore 3 on its circumference which ensures contact of the loaded ball-bearings between the shaft 8 and sleeve 1, and the radial return passage of these ball bearings during recycling, the closed circuits 4 being in two separate categories, the first category containing ball-bearings 6 smaller than the ball-bearings 7 of the second category, and means are provided to hold the casing 2 longitudinally with respect to the sleeve 1.

29 Claims, 16 Drawing Figures

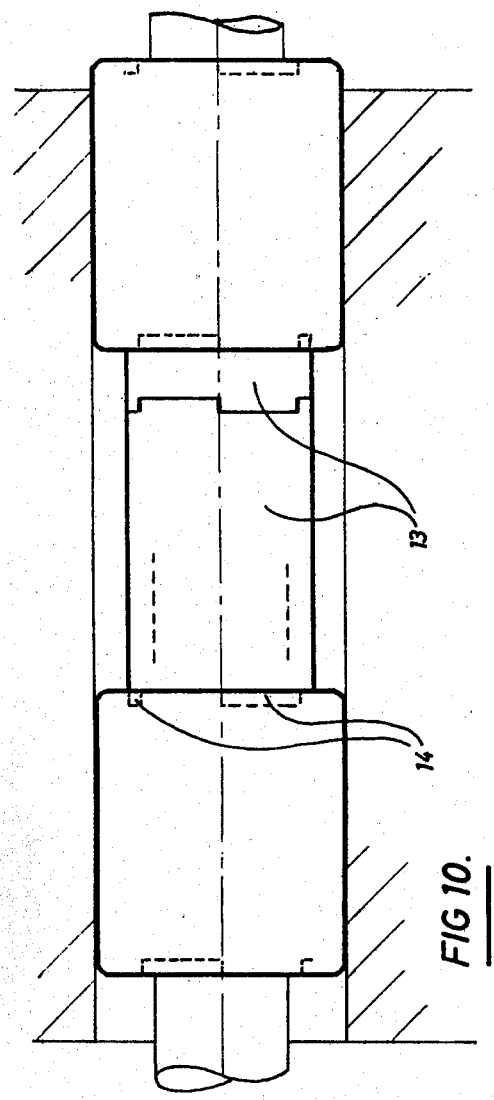
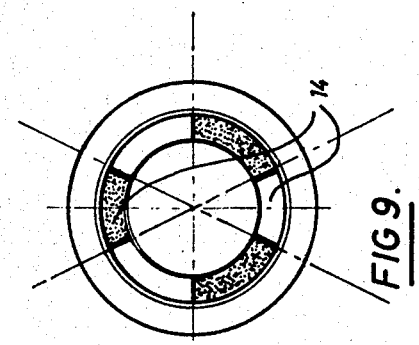
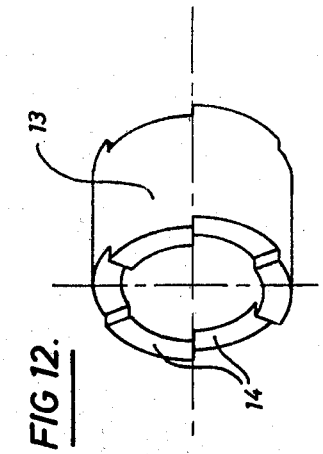
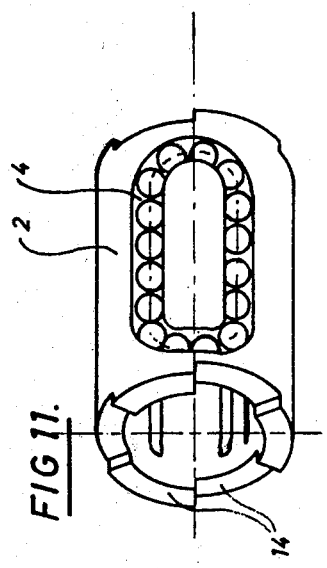
FIG 10.
FIG 9.
FIG 12.
FIG 11.

AXIAL/ROTARY GUIDE ELEMENT

The object of the present invention is a guide element for rotary movement and/or unlimited linear movement involving contact with ball-bearings on a smooth shaft, comprising an external sleeve and an internal tubular casing that can rotate freely relative to the sleeve and which comprises housings in the form of closed circuits formed by two longitudinal rectilinear portions intersecting the wall of the casing and joined to one another by curved portions at their ends, these circuits being provided with ball-bearings that effect contact between the shaft and the bore of the sleeve.

Elements for linear guidance of a cylindrical element involving contact with ball-bearings circulating on a shaft are known under various names, such as axial bearings, linear bearings and ball-bearing boxes. These names generally refer to the same object, namely guidance of a cylindrical element by means of ball-bearings on a shaft, the ball-bearings being recycled in endless closed circuits, which gives an unlimited linear movement to the element. In the particular case where a rotational movement is desired separately from or at the same time as the translational movement, recourse is made to so-called axial and rotary bearings or linear rotary bearings. At the present time two types of bearings permitting a rotation and an unlimited translational movement are available on the market.

The main disadvantage of the so-called "two bearings" principle, which consists of mounting a needle bearing or a radial ball-bearing on the exterior of a linear bearing with circulating ball-bearings, is that its external dimensions are too large for small elements.

The principle of alternating contact and circulation of ball-bearings in a casing involves a casing which consists of an external cylindrical sleeve comprising, in its bore, disengagement sections and working sections, the latter effecting contact with the shaft via ball-bearings arranged in closed circulation circuits made in a freely rotatable tubular casing situated in the sleeve and positioned axially relative to the sleeve by stop means. Rotation is made possible by alternating contact between the working sections and the ball-bearings in the rectilinear parts of the circuits of the casing if the reciprocal angular values are in accordance with a law utilising a geometrical aperture in a general combination. This system is effective for high precision axial and rotary guiding systems, but its defects include a limit on the load capacity, rotational speed and high manufacturing costs, and in addition a large number of ball-bearing circuits are necessary to enable it to be realised geometrically. Furthermore, this element is difficult to manufacture with small dimensions.

The object of the present invention is to obviate these disadvantages and provide an element for unlimited linear displacements on a shaft, accompanied or not by a rotational displacement, having the following characteristics:

a simple construction involving a minimum number of parts and ball-bearings
low manufacturing costs
high load capacity
little variation in the load capacity regardless of the movements during use
small overall dimensions
well suited to rotational speeds
good reliability
good guiding precision
an internal geometrical arrangement enabling the element to be manufactured having small dimensions.

The guide element according to the invention is characterised in that the sleeve comprises a continuous cylindrical bore in its interior, and the ball-race is provided with at least three separate closed ball-bearing circulation circuits, all the ball-bearings of at least one circuit forming a group of ball-bearings of different diameter compared with the ball-bearings of the other circuits.

According to a preferred embodiment, the ball-race is provided with three closed ball-bearing circuits, one of the circuits being provided with ball-bearings similar to one another but whose diameter is smaller by a factor of 1/10 to 1/100 of the diameter of the ball-bearings of the two other circuits. The three circulation circuits may form an angle of 120° with one another.

According to another embodiment, the ball-race is provided with four closed ball-bearing circulation circuits, two of these circuits being provided with ball-bearings similar to one another but whose diameter is smaller by a factor of 1/12 to 1/110 of the diameter of the ball-bearings of the two other circuits. In this embodiment involving four circulation circuits, two of the straight lines each forming part of two circuits may form between one another an angle at the centre of 110°, the two other straight lines of the two other circuits forming with one another an angle at the centre of 80°, the bisectrix of these angles passing through a plane of symmetry of the element.

The ball-race may comprise more than two separate groups of ball-bearing diameters and/or may include more than four closed ball-bearing circulation circuits.

The object of the invention is also a guide element for rotational movement and/or unlimited linear movement involving contact with ball-bearings on a smooth shaft comprising an external sleeve and an internal tubular casing, which casing comprises housings in the form of closed circuits formed by two longitudinal rectilinear portions intersecting the wall of the casing and joined to one another by curved portions at their ends, these circuits being provided with ball-bearings that effect contact between the shaft and the interior of the sleeve, characterised in that the sleeve is in the form of a cylindrical collar held between two end caps integral with the ball-race and secured thereto, the length of the collar being substantially equal to the length of the rectilinear portions of the ball-bearing circuits and the ball-bearings located in the end curved portions of the circuits being positioned radially by tunnels made in the circular caps, the internal front face of each of the caps producing a frictional force acting against the corresponding front faces of the collar.

The drawings illustrate, by way of example, several embodiments and variants of a guide element for rotary and/or unlimited linear movement involving contact with ball-bearings on a shaft according to the invention.

In the drawings:

FIG. 9 illustrates an element in the variant comprising a polar indexing system for the casing;

FIG. 10 illustrates a form of assembly of two elements of FIG. 9 with a plurality of tie members indexing the casings in the same polar position;

FIG. 11 illustrates a ball-race comprising the polar indexing system of FIGS. 8 to 10;

FIG. 12 illustrates a tie member;

Figure 1:
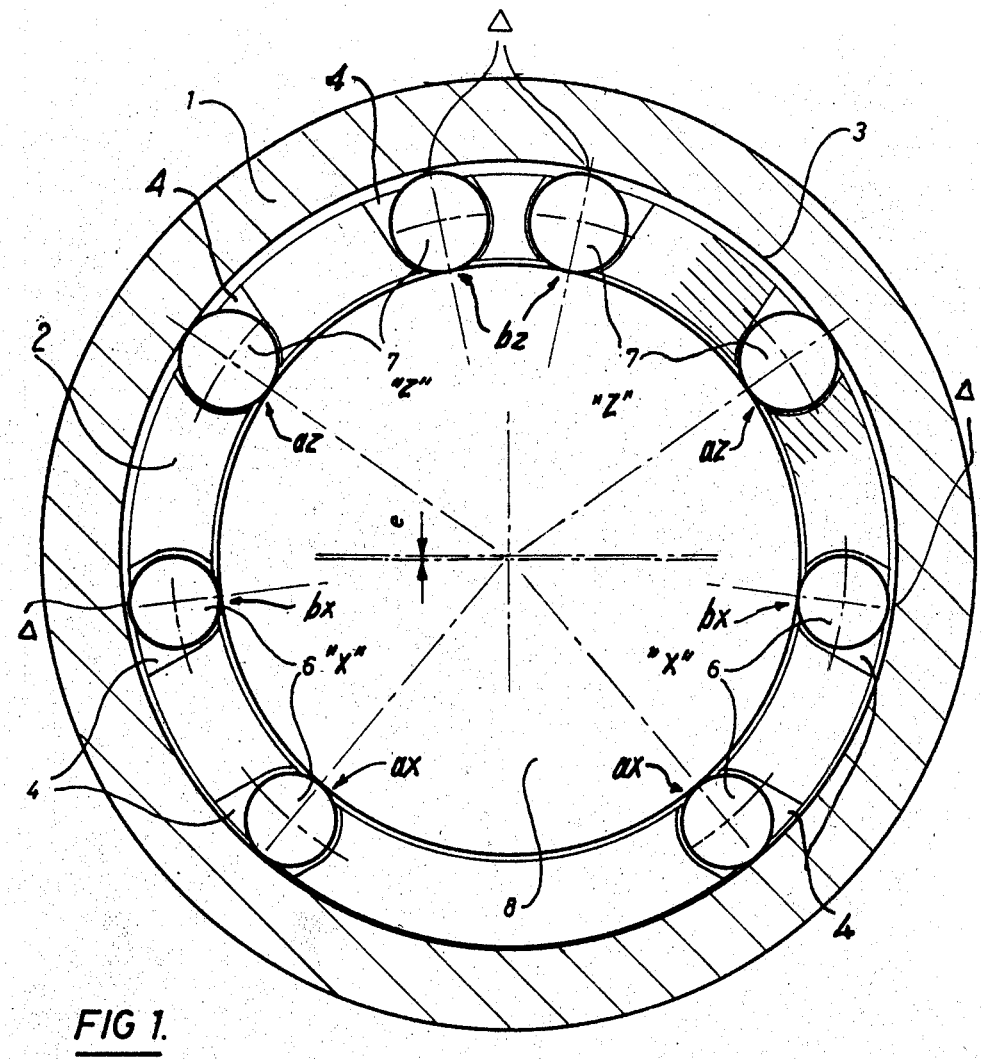
FIG. 1 is a radial section through a first embodiment of an element in a form comprising four ball-bearing circuits.

The guide elements for rotary and unlimited linear movements illustrated in FIGS. 1 to 6 comprises an external sleeve 1, a ball-race 2, ball-bearings 6 and 7, a shaft 8, and means 9 for axially retaining the casing 2 relative to the sleeve 1. The external sleeve 1 comprises a cylindrical bore 3 not containing any working and disengagement sections, as is the case in sleeves of the prior art. This working contact bore 3 is thus continuous over the whole of the circumference of the sleeve 1. The ball-race 2, which can rotate freely, is situated within the sleeve and comprises at least three closed circuits 4 for circulation of ball-bearings, wherein these circuits 4 consist of two longitudinal rectilinear portions that intersect the wall of the casing 2 and are connected at their ends by curved portions 5.

For a better understanding of the construction and operation of the element, such circulation circuit 4 for ball-bearings is formed by a contact or load rectilinear portion called "a" and by a discharge or recycling rectilinear portion called "b"; moreover, the closed circulation circuits are divided into two categories (see FIGS. 1 and 4), namely category "x" and category "z", the circuit or circuits of category "x" being provided with ball-bearings 6 all of the same diameter but slightly smaller than the diameter of the ball-bearings 7 of the circuits of category "z". Furthermore, the longitudinal rectilinear portions "ax and az" will be termed contact rectilinear portions, and the rectilinear portions "bx and bz" will be termed recycle rectilinear portions.

Figure 4:
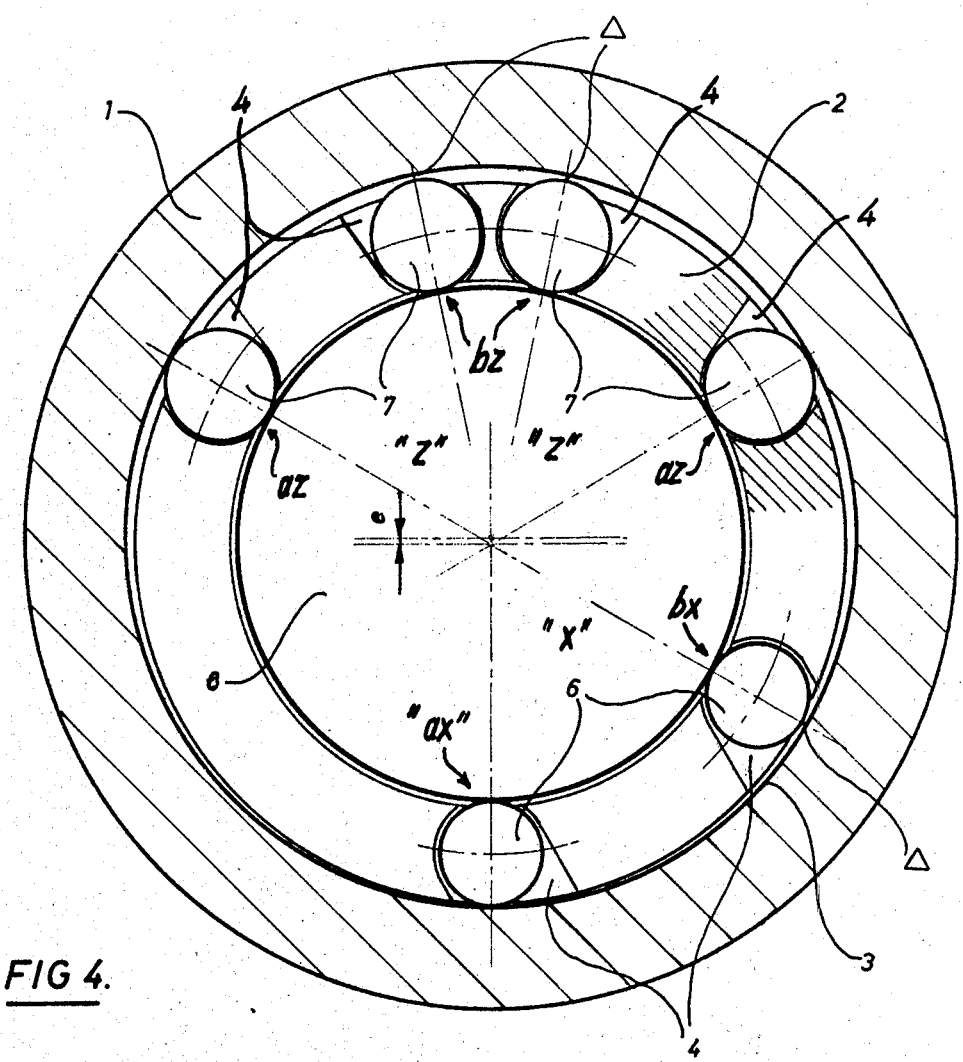
FIG. 4 is a radial section through a second embodiment of an element in a form comprising three ball-bearing circuits.
Figure 5:
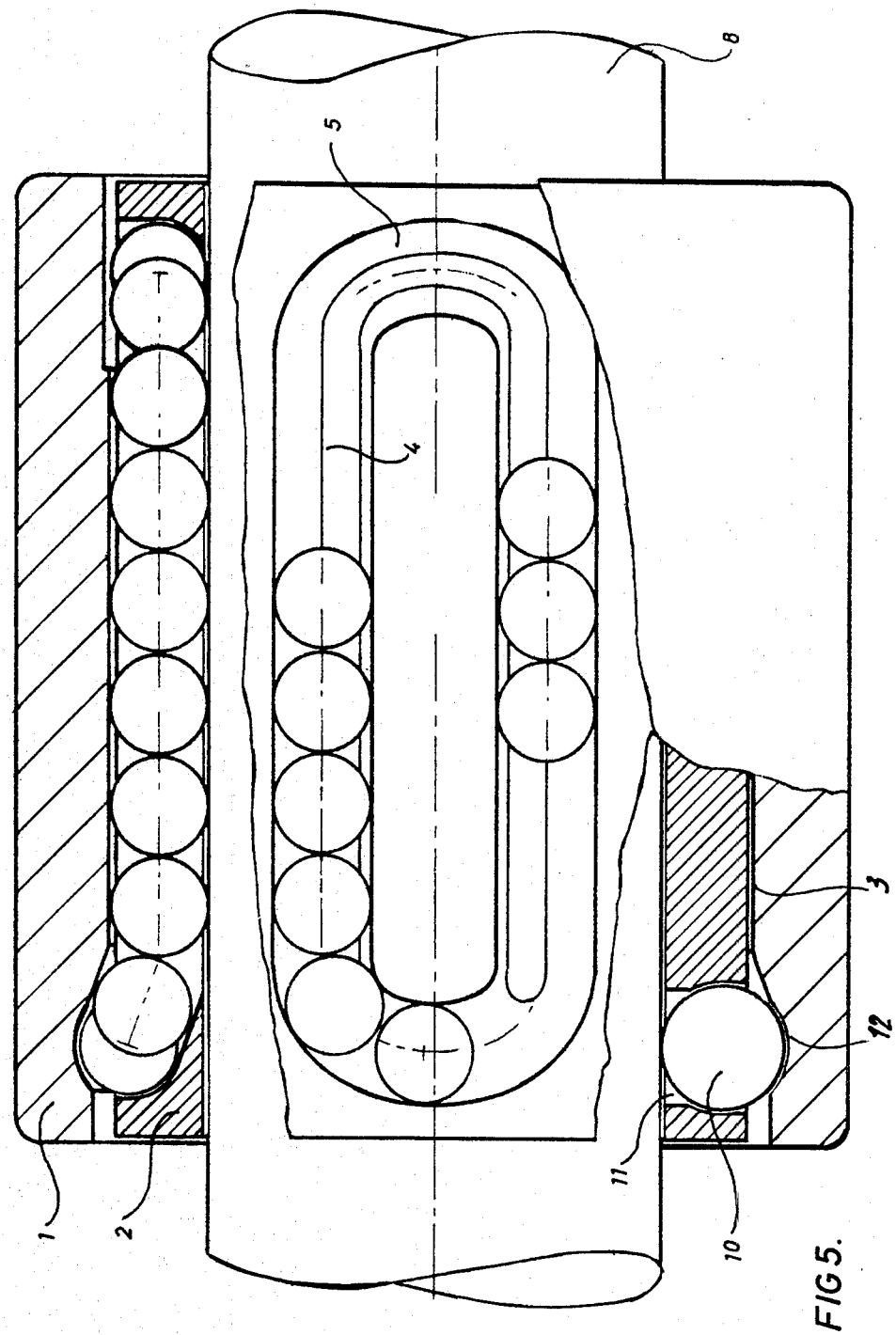
FIG. 5 is a side view, partially in section, of the embodiment of FIG. 4, and including an axial retention of the casing by a system involving two ball-bearings at 180°.
Figure 6:
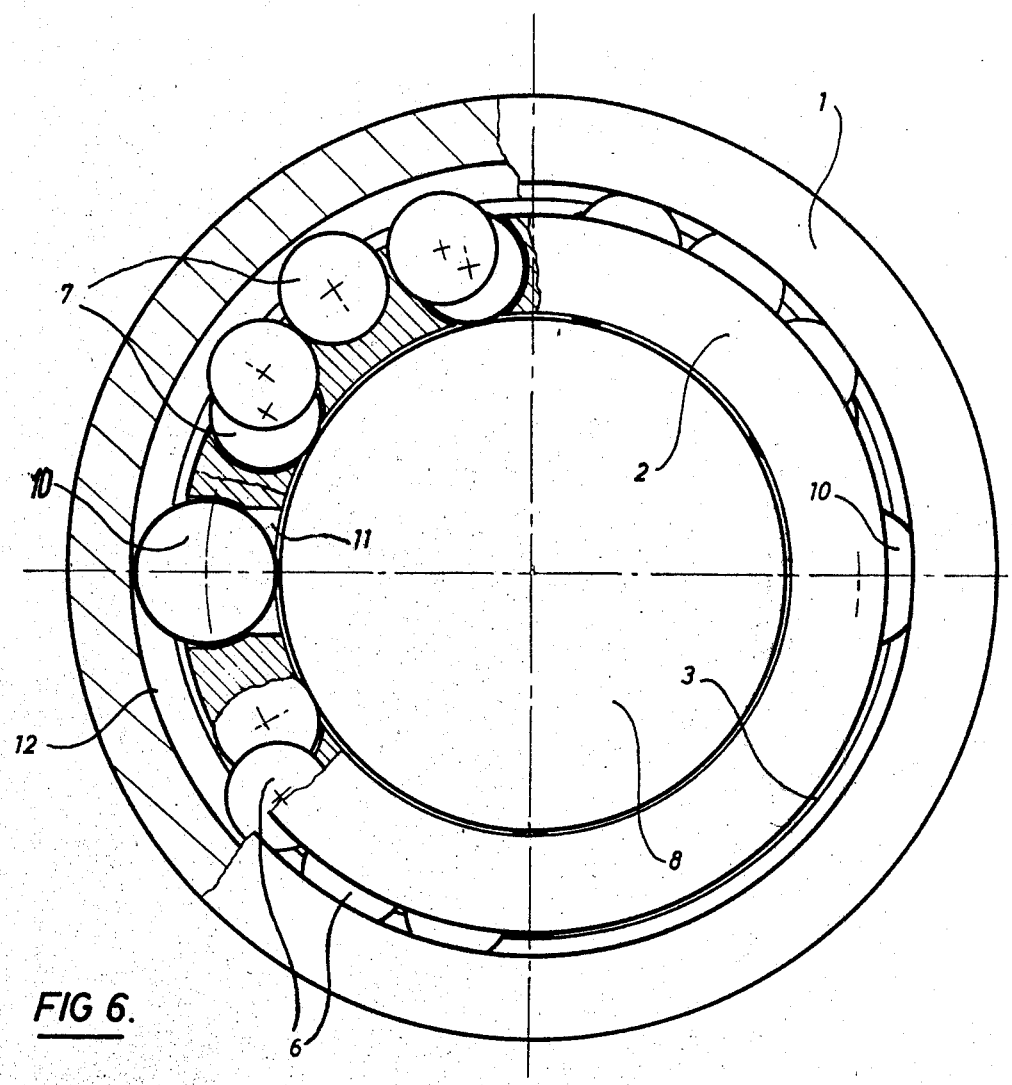
FIG. 6 is a front view, partially in section, of the embodiment of FIGS. 4 and 5.

In the second embodiment of FIGS. 4 to 6, the element is provided with three closed circuits 4 for circulation of ball-bearings (see in particular FIG. 4), one circuit being of category "x" and the other two circuits being of category "z", which produces a contact rectilinear portion termed "ax", the other two contact rectilinear portions being termed "az". In this realisation the three contact rectilinear portions "1ax+2az" form an angle at the centre of about 120° with respect to the circumference of the casing. The two recycle rectilinear portions "bz" are located close to one another and form an angle at the centre of at most 30°, the bisectrix of this angle being the same as the bisectrix of the angle of 120° at the centre formed by the two contact rectilinear portions "az", the recycle rectilinear portion "bx" being situated approximately diametrically opposite either of the two contact rectilinear portions "az". In this realisation the difference in diameter between the ball-bearings 6 of the circuit of category "x" and the diameter of the ball-bearings 7 of the circuits of category "z" is between 1/10 and 1/100 of the average diameter of the ball-bearings of the element.

Figure 2:
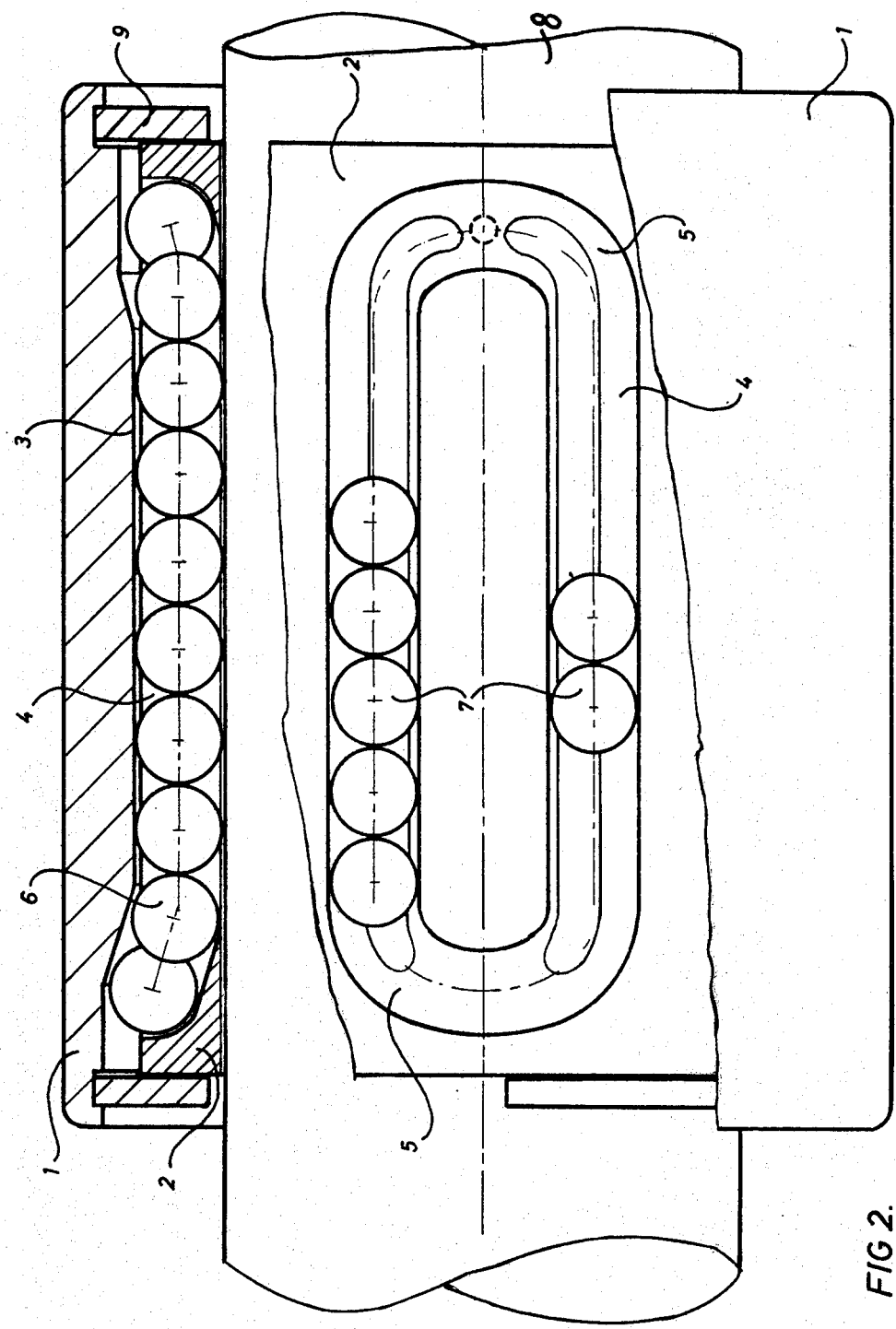
FIG. 2 is a side view, partially in section, of the embodiment of FIG. 1.
Figure 3:
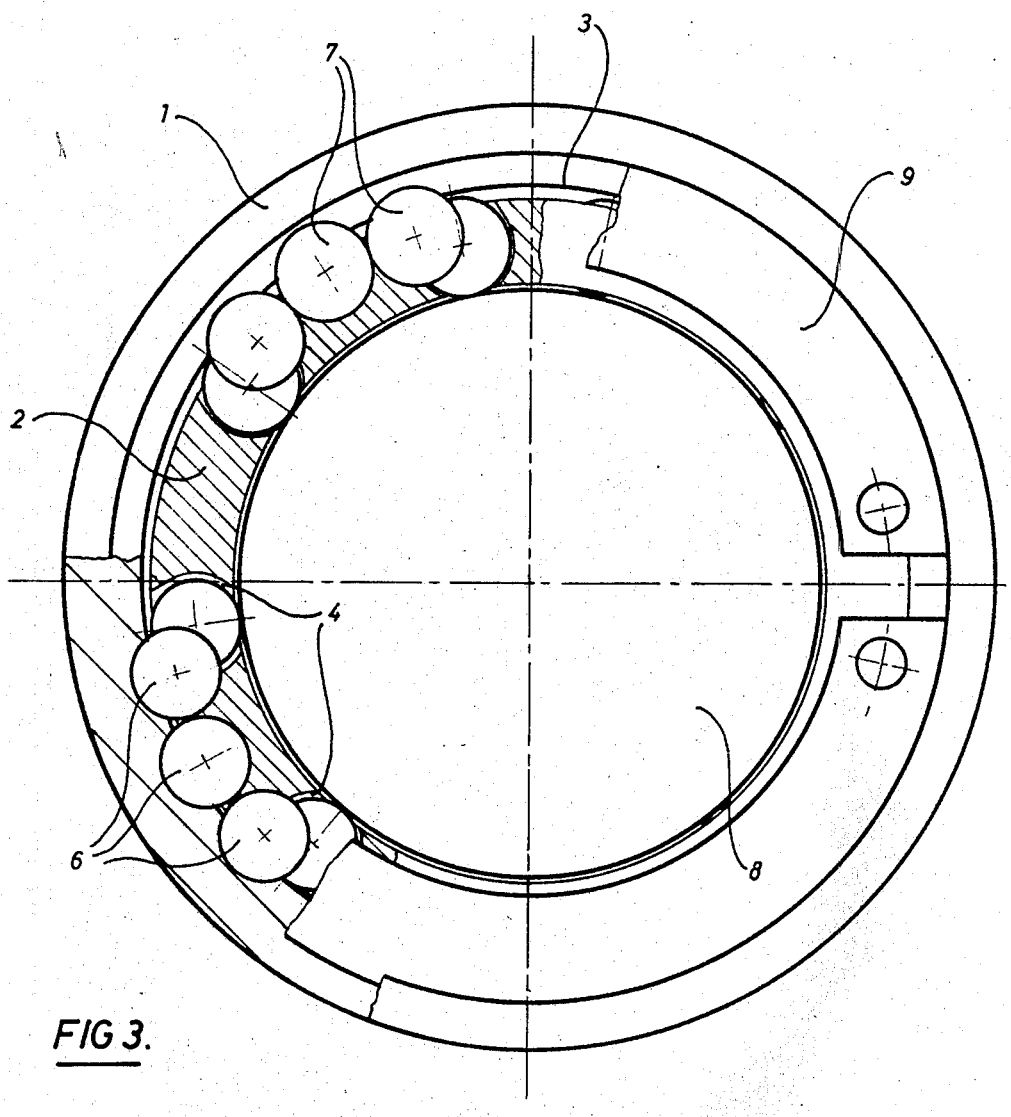
FIG. 3 is a front view, partially in section, of the embodiment of FIGS. 1 and 2.

In the first embodiment of FIGS. 1 to 3, the element is provided with four closed circuits 4 for circulation of ball-bearings, two of these circuits being of category "x" and the other two circuits being of category "z", which produces two contact rectilinear portions termed "ax", the two other contact rectilinear portions being termed "az". In this realisation the two contact rectilinear portions "az" form an angle at the centre of about 110° with respect to the circumference of the casing, the two contact rectilinear portions "ax" forming an angle at the centre of about 80° with respect to this circumference. Furthermore, an axis of symmetry of the element passes through the bisectrices of these angles. The two recycle rectilinear portions "bz" are situated closed to one another and form an angle at the centre of at most 30°, the bisectrix of this angle being centred on the bisectrices of the aforementioned angles at the centre of 110° and 80° formed by the contact rectilinear portions "az and ax", the two recycle rectilinear portions "bx" forming an angle at the centre of about 170°, whose bisectrix is centred on the bisectrices of the afore-described angles. In this realisation the difference between the diameter of the ball-bearings 6 of the circuits of category "x" and the diameter of the ball-bearings 7 of the circuits of category "z" is between 1/12 and 1/120 of the average diameter of the ball-bearings of the element.

By virtue of the angular arrangement of the longitudinal rectilinear portions of the ball-bearing circuits and by virtue of the difference in diameter between the ball-bearings of certain of these circuits, there is a small decentring "e" of the bore 3 of the sleeve 1 with respect to the shaft 8 (see FIGS. 1 and 4). This decentring "e" serves to produce a radial clearance "Δ" sufficient to enable the return circulation of the recycle rectilinear portions "bx and bz". In actual fact, this radial clearance "Δ" rotates together with the casing, and on account of the general geometrical arrangement of the rectilinear portions for the ball-bearings, this clearance "Δ" exists only for the ball-bearings of the rectilinear portions of group "b", the rectilinear portions of group "a" having their ball-bearings in working contact at suitable angular positions between the bore 3 of the sleeve 1 and the shaft 8.

A calculation of the value "Δ" defined as being the clearance between the internal bore of the sleeve 1 and the top of the ball-bearings of the rectilinear portions "b" in two examples of elements gives the following numerical values:

Arrangement with three circulation circuits for ball-bearings situated angularly according to the example of FIGS. 4 to 6.

Diameter of the shaft = 12 mm.
Diameter of the ball-bearings of the circuit "x" = 2.381 mm.
Diameter of the ball-bearings of the circuits "z" = 2.5 mm.
Diameter of the bore of the sleeve = 16.922 mm.
Decentring "e" = 0.079 mm.
Clearance "Δ" for the ball-bearings of the rectilinear portions "bz" = 0.039 mm.
Clearance "Δ" for the ball-bearings of the rectilinear portions "bx" = 0.04 mm.

Arrangement with four ball-bearing circulation circuits arranged angularly according to the example of FIGS. 1 to 3.

Diameter of the shaft = 12 mm.
Diameter of the ball-bearings of the circuits "x" = 4.0 mm.
Diameter of the ball-bearings of the circuits "z" = 4.170 mm.
Diameter of the bore of the sleeve = 38.195 mm.
Decentring "e" = 0.129 mm.
Clearance "Δ" for the ball-bearings of the rectilinear portions "bz" = 0.053 mm.
Clearance "Δ" for the ball-bearings of the rectilinear portions "bx" = 0.088 mm.

It should be noted that the ratio "Δ" may be taken as approximately e/2 in the arrangement involving three circuits, and that this latter arrangement is relatively better geometrically than the arrangement involving four circuits.

Since practical tests have demonstrated that a radial gap "Δ" having a value of 1/120 of the diameter of the ball-bearings is sufficient to allow a recycle passage of the ball-bearings of the rectilinear portions "b", the result is a new system that justifies what would have seemed impossible hitherto, namely to have a rotary and unlimited linear bearing involving circulation of ball-bearings by recycling without alternating contact with successive angular working sectors, this moreover with a small number of ball-bearings situated on a single working floor, these ball-bearings together ensuring a guiding contact for all the required movements. When the element rotates with respect to the shaft, it behaves like a conventional ball-bearing system, the casing rotating at a differential velocity. If the element undergoes a translational movement, the ball-bearings circulate in the races and pass along the curved portions of the circuits of the rectilinear portion "a" to the rectilinear portion "b". When the element is subjected to a combined axial and rotary movement, the ball-bearings rotate together with the casing and circulate in the circuits, the ball-bearings in working contact rolling in the direction of the resultant movement. The contact of the working ball-bearings is continuous despite the rotation, and the element thus suffers virtually no change in load capacity irrespective of its rotation. It should also be noted that the circulation of the ball-bearings always takes place in one direction in direct relation to the reciprocal displacement of the shaft and sleeve, irrespective of the angular movements. Moreover, when the element undergoes axial and rotary movement, the absence of working sectors and disengagement sectors in the sleeve enables the element to withstand high rotational velocities and imparts a good resistance to wear and tear, the ball-bearings being renewed by recycling and rolling, under working conditions, on continuous surfaces.

Furthermore, the described elements are particularly advantageous from the point of view of geometry when they involve three or even four ball-bearing circulation circuits, this small number favouring low manufacturing costs, the more so as the ball-race may be moulded from a plastics material, such as polyamide and the ball-bearings do not have dimensions restricted by too small an angular space. The aforementioned advantages relating to the embodiments of FIGS. 1 to 6 are effectively absent in the axial-rotary elements of the prior art involving alternating contact.

In addition, the element according to the invention may be manufactured having small dimensions, for example shaft diameters of 4 mm, the external diameter of the element being at most 8 mm. This particular feature is novel for a rotary and unlimited axial guide system involving contact with ball-bearings, and gives rise to possible future applications in fields such as mecanography, automation, electronics, aeronautics and other disciplines.

According to the embodiment of FIGS. 1 to 3, the ball-bearings are displaced from the shaft during passage in the curved portion of the circuits at at least one of their ends, and at this point they follow a substantially circular disengagement path in the form of a truncated cone in the interior of the sleeve and circulate on ascending and descending ramps in the casing in such a way that the tops of the ball-bearings are at a uniform radial distance in the groove of the sleeve. In order to enable the element together with the casing, previously equipped with its ball-bearings, to be installed, the said casing can be inserted into the sleeve only if the ball-bearings ascend radially in the curved portions of only one end of the casing. On account of this fact, the central parts of the circuits can only be connected to the whole casing at only one end (FIG. 5), or in a variant shown in FIG. 2 at two ends, the connecting tongue of the end of the casing in the right side of FIG. 2 then being of small cross-section relatively to the left connecting tongue.

According to a variant (not shown), at least one of the ends of the ball-bearing circuits may have more than one tongue for example, two tongues, the ballrace being intersected in the middle of the right-hand curved portion 5 of the circuit of FIG. 2. Circuits having three tongues will, for example, be used for guide elements of large dimensions.

Since the tubular ball-bearing casing 2 is located between the bore 3 of the sleeve 1 and the shaft 8, it may be located radially by these two references, an adequate clearance being provided. The casing may be positioned axially relative to the sleeve by frictional end stop means 9 or by ball-bearing stop means, not shown.

In the embodiment of FIGS. 4 to 6, the ballrace 2 is terminated longitudinally by means of two ball-bearings 10 of larger diameter than the diameter of the working contact ball-bearings, these two ball-bearings 10 being located in a seating 11 intersecting the wall of the casing opposite the circular groove 12 in the sleeve 1. These ball-bearings 10 position the casing axially, and engage with a small radial clearance in the circular groove 12 of the sleeve and are kept radially in place by the shaft 8 when the element is operating. This solution eliminates retaining frictional forces during a rotational movement and enables the ball-race to have exactly the same length as the sleeve, installation being simple with a casing made of plastics material since the retaining ball-bearings 10 can be introduced by deforming the inlet of their seating 11 from the inner side of the element. Furthermore, in order to benefit from an invariable radial clearance and the fact that they are of the same dimension, these two ball-bearings are placed at 180° with respect to one another on an axis of the element perpendicular to the direction of the artificial decentring "e".

Figure 7:
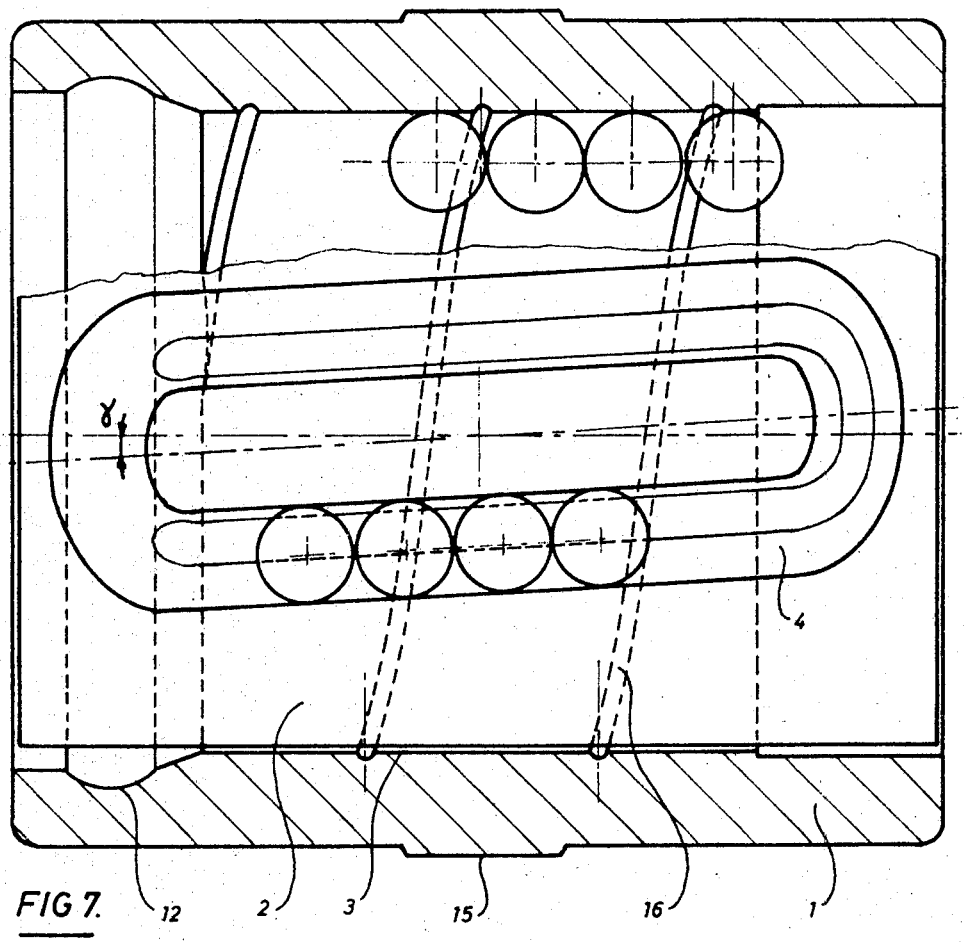
FIG. 7 is an axial section of a variant of an element in which the straight lines of the ball-bearing circuits are inclined with respect to the generatrices of the casing and a work discharge spiral is provided in the bore of the sleeve, the said sleeve having two external diameters conferring a self-aligning character to the element.

In the variant of FIG. 7, the rectilinear portions of the circulation circuits 4 are slightly inclined with respect to the generatrices of the casing, all the working rectilinear portions "a" being parallel to one another, which permits a favourable rolling distribution when the element functions purely in a linear manner, each working ball-bearing rolling on its own track. Nevertheless, the angle of inclination or helical angle may be at most 10° relative to the axis of the element, this mode of construction increasing, by virtue of the impossible geometric conditions, the load constraint on certain ball-bearings of the contact rectilinear portions "a". The result is a reduction in the load capacity of the element.

FIGS. 1 to 6 illustrate an embodiment comprising 3 ball-bearing circulation circuits and an embodiment comprising 4 such circuits. It is clear to those skilled in the art that the bearings described are not restricted to these two possibilities, and that bearings comprising 5 circuits, or even more than 5 circuits may be elaborated. Moreover, more than two different categories of circuits may be employed. For example, three categories of circuits may be provided, each category being equipped with ball-bearings of a different diameter.

The elaboration of the elements that have just been described is made possible by virtue of the decentring of the sleeve relative to the shaft by means of the intermediate unit creating this decentring "e", and this intermediate, namely the casing with its circuits of ball-bearings of different dimensions, positions relatively two cylindrical surfaces. According to the embodiment, at least two rectilinear portions of ball-bearings roll on the reflection of the surfaces tangential to the shaft and to the bore of the sleeve, making a slight angle with respect to one another, and these ball-bearings will thus tend to deviate from the working direction during a linear displacement on account of the lateral resultant forces in the direction of movement. In normal use this extraneous effect may be regarded as negligible, and since the length of working contact of the sleeve is relatively short the ball-bearings are no longer subjected to this effect during recycling, and the deviation is thus cancelled each time the ball-bearings leave working contact. However, this effect is inconvenient if the element operates only over a short alternative course, which is why in one variant this disadvantage may be cancelled by providing the bore of the sleeve with a spiral 16 (FIG. 7) of small width and depth that alternately discharges the working ball-bearings, the pitch of this spiral 16 being such that contact is lost over only one ball-bearing at a time in the rectilinear portion "a".

Moreover, during continuous rotary use in a single direction, by virtue of the relationships of the circumferences between the bore of the sleeve, shaft and the different sizes of ball-bearings, the latter being arranged in a planetary system, the ball-bearings of small diameter will tend to overtake the ball-bearings of large diameter in the direction of rotation. This effect is cancelled in normal use where the ball-bearings recycle in a movement that is also sufficiently large linearly. In other cases the variant involving the spiral 16 cancels this effect. It should be noted that the relative differential velocity of the centre of gravity of the ball-bearings of different dimensions is in any case slight, the ratios of the circumferences of the ball-bearings 6, ball-bearings 7, shaft and bore of the sleeve giving a traversed path almost identical to the two categories of ball-bearings in a normal situation.

The element according to the invention, despite its decentring "e", may be used in numerous applications, the value of the eccentricity in most cases being within the required tolerances for axial and rotary guiding, in particular in automation processes, handling processes, position stop means, and movement transmission processes. In many cases the low cost price, good load capacity, operating qualities and the fact that it can operate without lubricants means that such a guide element can advantageously replace guide systems involving smooth bushings and bushes. Any limits on the system reside rather in the manner of installation, and in fact if the element is used by itself, and the guidance is sufficient, the problem of the small decentring will in principle not arise, but if on the other hand two elements are installed in line in a bore, they will have to be made dependent on one another, which is why the two elements are in this case joined by one or more tie members of the tubular connection 13 (FIG. 8) having the property of forming a modular unit enabling the elements to be installed at any desired interspacings. The tie members 13 have the particular feature of reciprocally locating the ball-races of the bearings at a predetermined angular position, and by virtue of this fact if two bearings have their casing in the same angular position the decentring of these two elements will be the same in the same direction, their axes will coincide, and the shaft working with these two guides will be situated in correct alignment conditions (see also FIG. 10).

In one variant the exterior of the sleeve 1 has two diameters, the relatively short main diameter 15 conferring a self-aligning behaviour on the element in its mounting, the mutual working position of two elements with the same shaft being determined by this fact.

Figure 8:
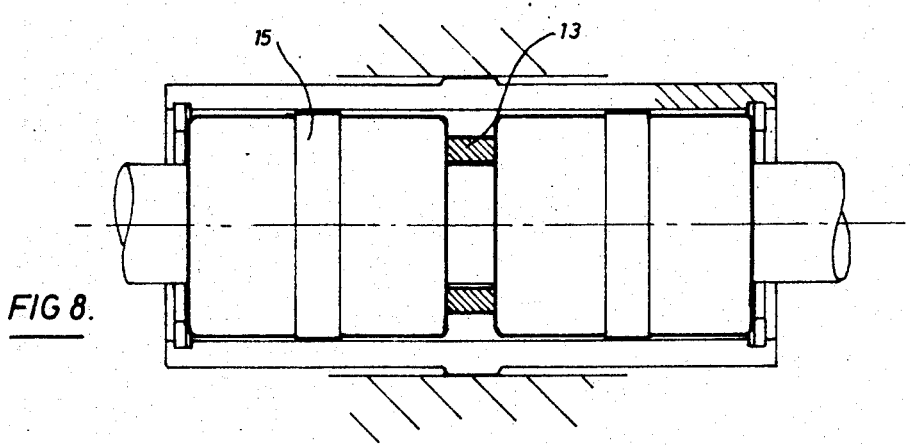
FIG. 8 illustrates a form of assembly in a tubular member balancing the eccentric of a pair of elements of an embodiment shown in FIG. 9 and comprising a sleeve having a self-aligning character, the elements being joined to one another by a tie member indexing, in an inverse polar position, the casing of the elements.

On combining the two solutions described above, it is possible using four bearings having self-aligning characteristics and connected in pairs by a tie member 13 that positions each element of one pair at an inverse angular position, the pairs of elements being mounted in an external tube also having a self-aligning nature, to obtain in this particular case a perfectly concentric guidance using a common shaft (see FIG. 8).

The tie members 13 have an inverse geometrical indexing systems 14 at the two ends, at their image, the element ball-race 2 of this variant has the same indexing 14 at its ends, and consequently it is sufficient to turn the connected element in order to obtain an identical or inverse indexing (see FIGS. 8, 9, 10, 11 and 12). The shapes of the polar indexing means 14 of the ball-race end of the tie members 13 can be made simply if these pieces are produced from a moulded plastics material such as polyamide (see FIGS. 11 and 12). The tie members 13 are positioned radially by their internal bore, the diameter of which is slightly greater than the diameter of the shaft in conjunction with which the elements operate.

It should be noted that if two guide elements according to the invention are located at a sufficient mutual interspacing, they may in principle operate with the same shaft without the addition of an indexing system, the error due to the decentring "e" being absorbed by the adjustment tolerance of the shaft in the elements.

Figure 13:
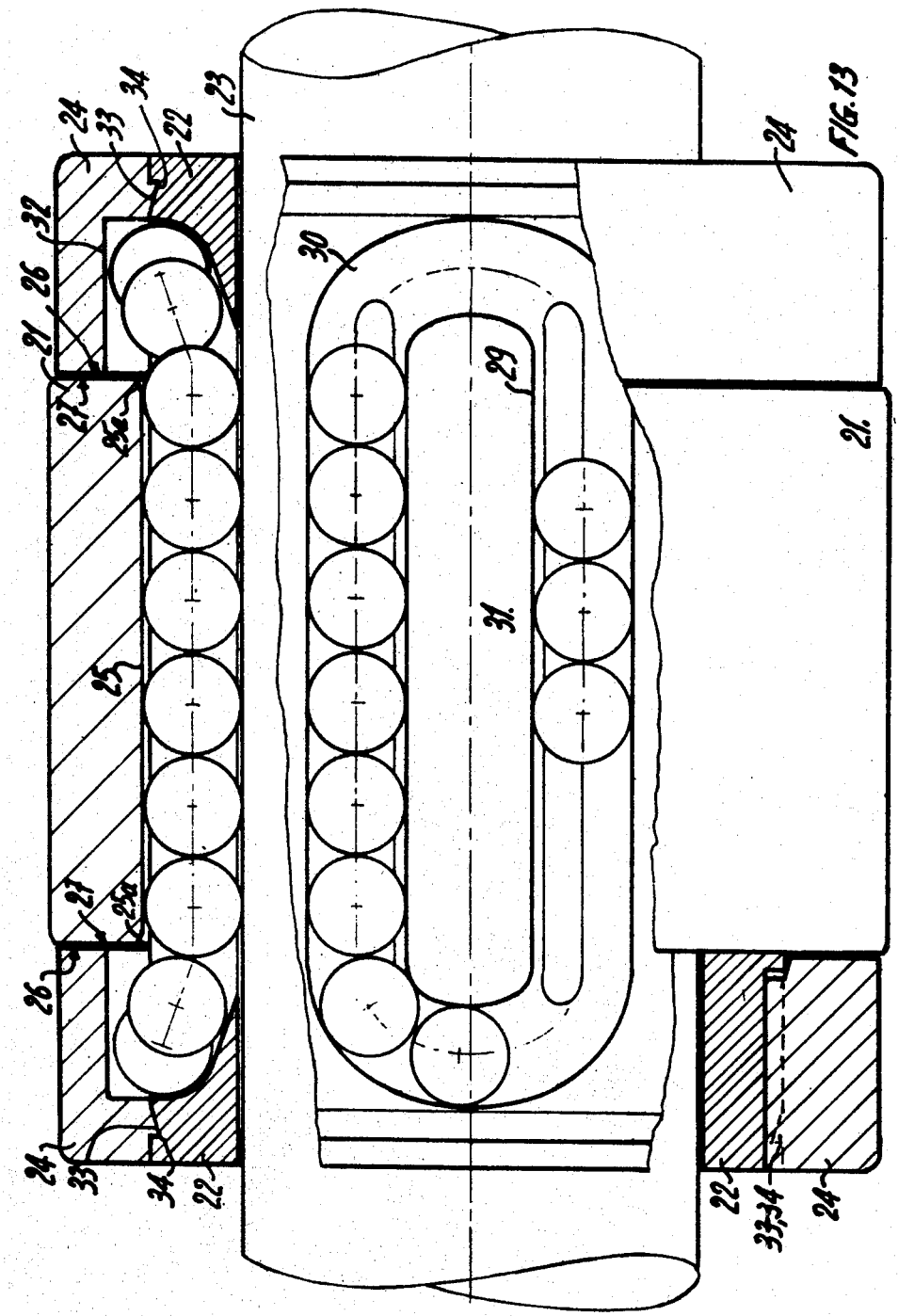
FIG. 13 is a side view, partially in section, of the first variant of the embodiments of FIGS. 1 to 6.
Figure 14:
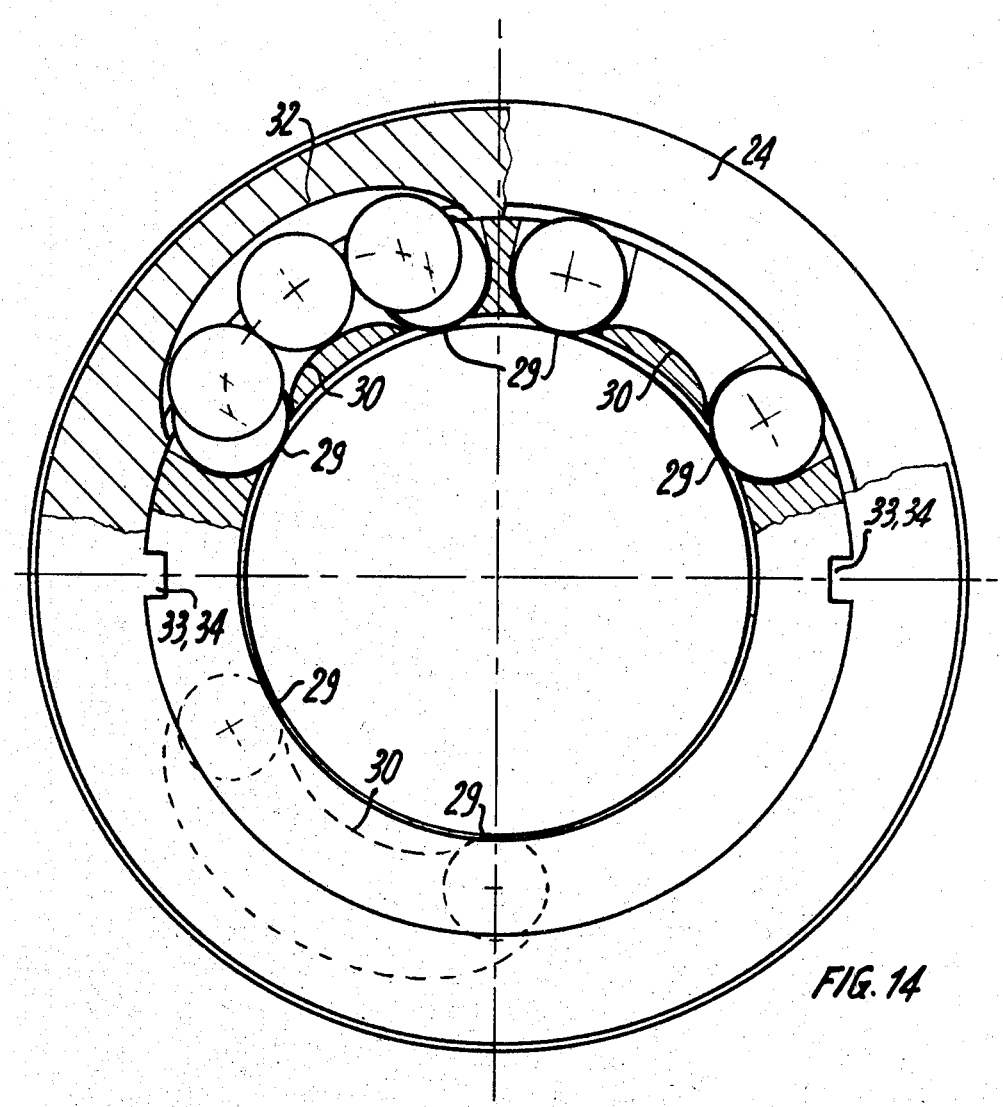
FIG. 14 is a front view, partially in section, of the first variant of FIG. 13.

In the first variant of FIGS. 13 and 14, which may be an element involving three, four or a larger number of ball-bearing circuits for linear and/or unlimited rotary movement on a shaft 23, the sleeve is in the form of a steel collar 21 and the ball-race 22 serves to support two end caps 24 which enclose the collar 21. The tubular collar 21 has no disengagement sector and its bore 25 is perfectly circular and smooth, and of a constant diameter over its whole length. The inner bore 25 shows however at its ends two rounded parts 25a (FIG. 13) intended to avoid that a sharp edge is presented to the ball-bearings. According to a variant (not shown), the rounded parts 25a of the ends of the inner bore 25 can be replaced by parts shaped in frustum of cone. By virtue of this fact the manufacturing costs for this collar 21 are low compared with the relatively complicated sleeves of the axial and rotary bearings existing on the market. The element of FIGS. 13 and 14 is made from a casing 22 and the rotary caps 24 of plastics material. The result is an axial and rotary guide system involving ball-bearing contact, of low cost price. In addition, the dimensions of the element are sufficiently small to enable it to be used in numerous applications.

The collar 21 is positioned under frictional forces in the centre of the ball-race 22 by means of the two caps 24 secured to this ball-race 22, a small clearance being provided between the faces 26 of the caps 24 and the faces 27 of the collar 21 so as to enable the latter to turn with respect to the casing-caps assembly. The ball-race 22 comprises at least three closed ball-bearing circulation circuits 29, these circuits 29 consisting of two longitudinal rectilinear portions intersecting beyond the wall of the ball-race 22 and connected at their ends by curved portions 30. In these curved portions 30 the ball-bearings are distant from the shaft 23 in order to permit the existence of a section of material serving to maintain the central part 31 of the circuits 29. In order to permit this radial distancing of the ball-bearings, the caps 24 comprise, opposite the curved portions 30, tunnel-shaped recesses 32 dimensioned so that the ball-bearings situated in the curved portions 30 have an operating radial clearance between the bottom of the curved portions of the circuit and the cap 24. As shown in FIGS. 13 and 14 as well as in FIGS. 15 and 16 described hereinafter, the tunnel-shaped recesses 32 are parallel to the axis of the element opposite the curved portions of the ball-bearing circuits. In a preferred realisation the caps are secured axially to the casing and are prevented from rotating by a combination of positive parts 33 and disengagement parts 34 in the caps 24 and at the ends of the ball-race 22, installation being made possible by elastically deforming the materials employed.

It is clear to those skilled in the art that the positive parts 33 and disengagement parts 34 provided in the caps 24 and at the ends of the casing 22 may be omitted or replaced by simple grooves and corresponding tongues. The caps may in this case either be bonded or welded to the ends of the casing.

Figure 15:
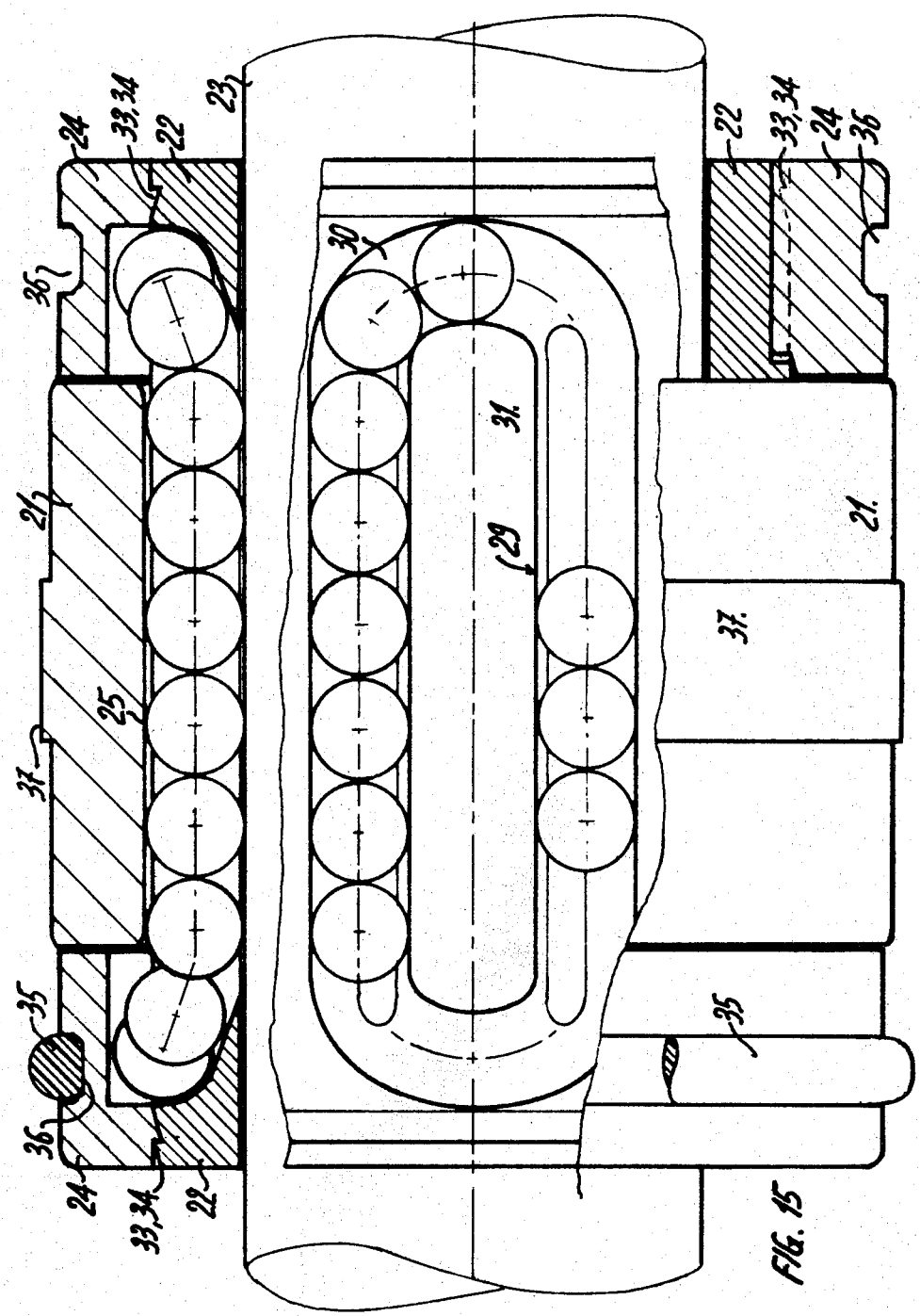
FIG. 15 is a side view, partially in section, of a second variant of the embodiments of FIGS. 1 to 6.
Figure 16:
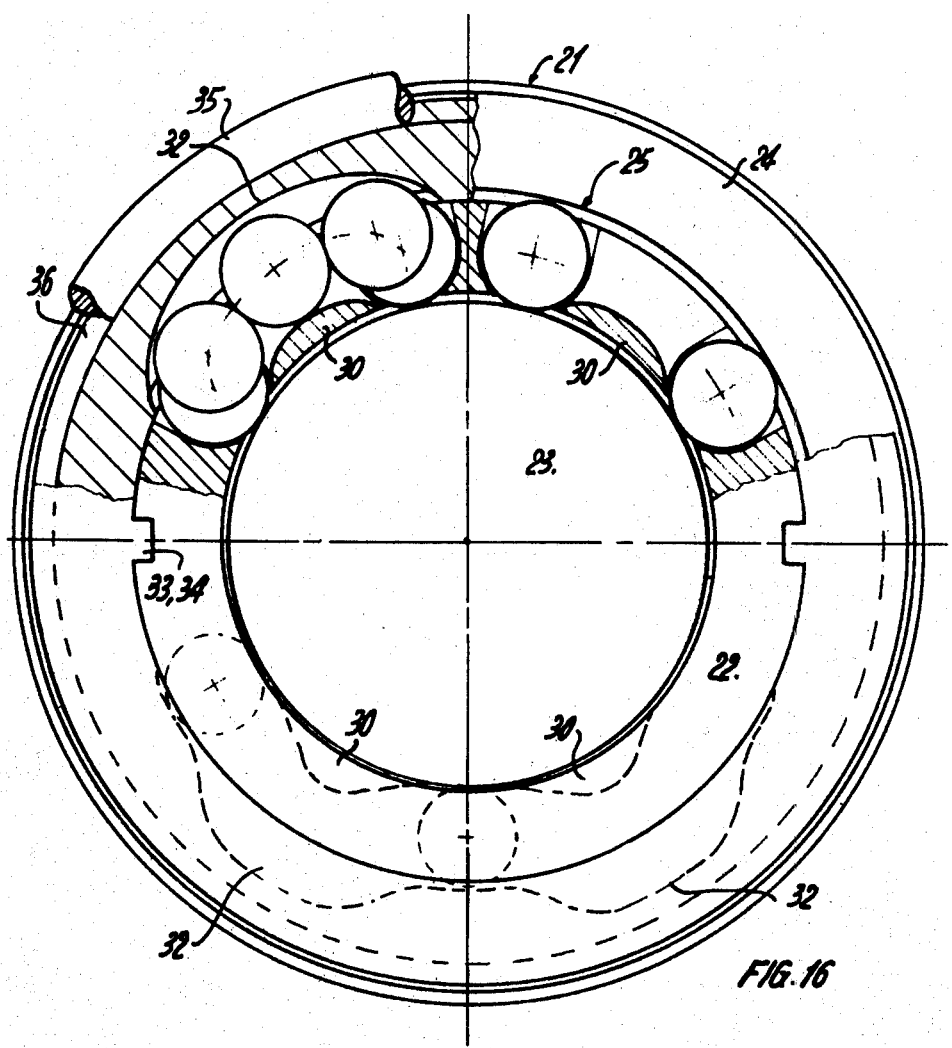
FIG. 16 is a front view, partially in section, of the second variant of FIG. 15.

The second variant of FIG. 15 and 16 includes all the intergers 21 to 34 described with regard to the variant to FIGS. 13 and 14. However, each of the end caps 24 has a band of elastomeric material 35 positioned for example in a groove 36 on the external diameter of each cap. These bands 35 serve to retain the casing 22/cap 24 assembly in the mounting, not shown, in which the element is fixed, which in this case becomes a ball-bearing guide arrangement for linear movement only. In this case the eccentricity "e" may be used to change a "inter axis" distance by turning the casing-cap assembly during installation in the mounting. These bands 35 may also serve generally to retain the element in a mounting (not shown) less precisely dimensioned or of larger dimensions.

By way of variation, it is possible to replace the bands 35 by means for preventing the ball-race rotating with respect to the sleeve. Moreover, the external diameter of the sleeve may be machined eccentric with respect to its internal diameter by the same amount as the decentring due to the differences in diameter of the ball-bearings in the circulation circuits. By positioning the ball-race in a suitable manner with respect to the sleeve and blocking it, the eccentricity of the element may then be eliminated, the element thus becoming an element for linear displacement only.

In the second variant of FIGS. 15 and 16, the steel collar 21 contains at its centre and on its exterior a short circular part 37 at the nominal adjustment diameter, this diameter 36 alone being corrected. The element, combined or not with the bands of elastometric material, in this case has a self-aligning property. In addition to these advantages, this latter variant permits the rational utilisation of two elements that may be brought close to one another on the same shaft, the small eccentricity "e" being of no consequence for solutions of transmission of movement frequently encountered in industry and automation.

The element shown in FIGS. 15 and 16 has ball-bearing circuits 29 whose rectilinear portions are extended into the tunnels 23. The tongues forming the curved portions 30 constitute the start of the bend in the curved portion of the circuit, and then begin to rise relative to the shaft 23 as shown in FIG. 16.

The variant illustrated in FIGS. 15 and 16 is an element comprising three ball-bearing circuits and the caps (see FIG. 16) have four tunnels 32, the two lower tunnels being symmetrical and only one being used in the variant of FIGS. 15 and 16. This feature means that only one cap need be used at the two ends of the ball-race.

The element according to the invention and described with regard to FIGS. 1 to 12 comprises a sleeve of hardened steel having a hardness of about 62 RC, trued in its bore and on its exterior. The absence of working sectors and disengagement sectors in addition enables the interior to be machined by "honing", which substantially reduces the tooling costs involved in manufacture. The ball-race is, in a preferred embodiment, moulded of a self-lubricating plastics material such as graphite-containing polyamide 6. The ball-bearings are of chromium steel, their hardness is about 62 RC, and their spherical accuracy and accuracy of diameter is of the order of a micrometer.

The element according to the invention can be realised from diameters of the shaft of the order of 3 to 4 millimeters, up to more than 50 millimeters. The diameter of the ball-bearings is between ¼ of the diameter of the shaft for the smallest examples, and 1/9 of the diameter of the shaft for the large examples. The number of ball-bearing circuits is three for the small examples and may be four for the examples where the diameter of the shaft ranges from 12 mm up to about 50 mm and above in the case of larger dimensions.

The working diameter of the shaft on the ball-bearings of the contact rectilinear portions is slightly pre-stressed on the shaft, being the maximum diameter of its tolerance, and for this reason the element is designed to operate with shafts having a tolerance of h6, such as are commonly found on the market.

The slight difference in the diameters of the ball-bearings of the different categories of circuits is often compensated by combining ball-bearings available on the market, and in particular by using metric dimensions on the one hand and imperial (inch) dimensions on the other hand, such as for example ball-bearings having a diameter of 1.5 mm with 1.588 mm = 1/16 × 25.4; 2.3812 mm = 3/32 × 25.4 with 2.5 mm; 3 mm with 3.175 mm = ⅛ × 25.4.

In a realisation, not shown, an even number of ball-bearings of two different dimensions may be placed in the circuits of the ball-race, independently of the category of the circuits, each large ball-bearing alternating with a small ball-bearing, the large ball-bearings ensuring working contact and the small ball-bearings serving as an intermediate and eliminating the friction caused by rotation of the ball-bearings in contact during a linear movement; nevertheless, this embodiment complicates the installation of the ball-bearings in the element and greatly reduces its load capacity.

In order to ensure a free circulation, the width of the tracks of the circuits have a value greater than about 1/10 of the diameter of the ball-bearings of these circuits, and on account of this fact circuits suitable for each category may be provided, also taking into account the multiple ball-bearing diameter calculation for the whole length of the circulation track.

I claim:

1. A guide element for ball bearings for permitting linear and rotational movement of a sleeve around a shaft, the guide element comprising:

an external sleeve having a continuous cylindrical bore in its interior;

an internal tubular casing within the sleeve bore that can rotate freely in the sleeve and that is retained axially relative to the sleeve; the casing extending around the shaft;

at least three seatings for receiving ball bearings being defined in the casing, whereby the casing defines a ball race; ball bearings being provided in all of the seatings; the seatings and the ball bearings being sized and shaped for permitting the balls to effect contact between the shaft and the bore of the sleeve;

each seating comprising a closed ball bearing travel circuit, comprising a first and a second neighboring, longitudinally extending rectilinear portion, and the first and second rectilinear portions of the seating being joined to one another by joining portions joining the longitudinal ends of the rectilinear portions, whereby the ball bearings in a seating may move around the entire circuit;

all of the circuits being one of either of a first and a second circuit, and there is at least one first circuit and at least one second circuit; all of the ball bearings of each of the first circuits being of same size relatively larger diameter, and all of the ball bearings of each of the second circuits being of same size relatively smaller diameter;

the casing being eccentric with respect to the sleeve to enable contact between the ball bearings and both of the shaft and the sleeve for both the larger and the smaller diameter ball bearings; the casing having a first side circumferentially around the casing and having an opposite second side circumferentially around the casing; each of the first circuits being at the first side of the casing and each of the second circuits being at the second side of the casing;

the first rectilinear portion of every circuit is located circumferentially around the casing at a location nearer to the second side of the casing having each of the second circuits, whereby the ball bearings in the first rectilinear portion of every circuit are able to contact both the sleeve and the shaft, while the second rectilinear portion of every circuit is located circumferentially around the casing at a location nearer to the first side of the casing having each of the first circuits, whereby the ball bearings in the second rectilinear portion are not able to contact both the sleeve and the shaft.

2. An element according to claim, 1, characterised in that there are three of the ball-bearing travel circuits, one of these circuits being the second circuit and the other two being first circuits, the ball-bearings in the second circuit are of a diameter that is smaller by a factor of 1/10 to 1/100 than the diameter of the ball-bearings of the other two first circuits.

3. An element according to either of claims 1 or 2, characterised in that there are three ball bearing travel circuits, wherein the first rectilinear portions form with one another an angle of about 120° at the centre.

4. An element according to claim 1 characterised in that there are four ball-bearing travel circuits, two of these being second circuits and being equipped with ball-bearings similar to one another but whose diameter is smaller by a factor of 1/12 to 1/110 compared with the diameter of the ball-bearings of the two other first circuits.

5. An element according to either of claims 1 or 4, characterised in that there are four ball-bearing travel circuits the first rectilinear portions two of the circuits forming with one another an angle of about 110° at the centre, and the two other first rectilinear portions forming with one another an angle of about 80° at the centre, the bisectrix of these angles passing through a plane of symmetry of the element.

6. An element according to claim 1, comprising tongue members at the joint portions of the ball-race which join the circuits and the tongue members at the two joining portions have different cross-sections at the two ends of the circuits.

7. An element according to claims 1 or 6, characterised in that the centre parts of the circuits are joined to the ball-race by three tongue members, two of these tongue members being arranged at one end of the circuits.

8. An element according to claim 1, characterised in that the rectilinear portions of the ball-bearing circulation circuits are parallel to the axis of the element.

9. An element according to claim 1, characterised in that at least one of the two rectilinear portions of each of the ball-bearing circulation circuits form an angle with a generatrix of the casing.

10. An element according to claim 1, characterised in that the means for positioning the ball-race axially relative to the sleeve are frictional retaining means.

11. An element according to claims 1 or 10, characterised in that the sleeve includes a cylindrical collar shorter than the element and the sleeve is held between two rotary caps fixed to the ball-race, the internal front face of each of the caps being for producing a frictional force with the corresponding front faces of the sleeve, the whole assembly comprised of the ball-race and caps being free to rotate relative to the sleeve.

12. An element according to claim 11, characterised in that the rotary caps comprise housings in the form of tunnels parallel to the element opposite the ball-bearing circuits.

13. An element according to claim 11, characterised in that the rotary caps are secured to the ball-race by interengaging means, these means being of corresponding shapes.

14. An element according to claim 11, characterised in that the rotary caps comprise housing means for at least one circular band of a flexible material on their external diameter.

15. An element according to claim 11, characterised in that the collar contains at an external diameter at least one circular groove for locating at least one elastomeric band.

16. An element according to claims 1 or 10, characterised in that the joining positions are curved, and the curved portions of the circuits are connected to one another by a short rectilinear portion following the circumference of the ball-race, the circuit being formed by four 90° curved portions and four rectilinear portions.

17. An element according to claim 1, characterised in that the means for positioning the ball-race axially relative to the sleeve are ball-bearing stop means.

18. An element according to claim 1, characterised in that the means for positioning the ballrace axially relative to the sleeve are at least one ball-bearing located in a separate seating in the casing and intersecting its wall opposite an internal circular groove in the sleeve at at least one end of the element.

19. An element according to claim 18, characterised in that the means for positioning the ball-race axially in a circular groove are two ball-bearings situated at 180° with respect to one another on an axis perpendicular to the bisectrix of the angle at the centre separating the two first rectilinear portions of the two circuits equipped with the largest ball-bearings of the element.

20. An element according to either of claims 18 or 19, characterised in that there is at least one internal groove in the sleeve for cooperating with the passage of the joining portions of the ball-bearing circuits and the internal groove is the same groove that positions the ball-bearings for the axial retention of the casing relative to the sleeve.

21. An element according to any of claims 1, 18 and 19, characterised in that the ball-race has at least one end means for the polar positioning of an additional piece on the element.

22. An element according to claim 21, characterised in that the polar positioning means are located at the two ends of the ball-race, the polar positioning means at one end being in an angular position displaced by 180° with respect to the polar positioning means at the other end.

23. An element according to claim 21, characterised in that the additional piece for the element is at least one tubular tie member comprising means engaging with the polar positioning means for the casing.

24. An element according to claim 1, characterised in that the external sleeve has, in its working bore, a spiral groove whose pitch is different to the diameter of the ball-bearings of the element.

25. An element according to claim 1, characterised in that the external sleeve is made of a previously hardened steel which is then trued on its external surface and in its interior bore.

26. An element according to claim 1, characterised in that the external sleeve has two external diameters, the larger diameter having a length at most one quarter of the total length of the element.

27. An element according to claim 1, characterised in that the external diameter of the sleeve is trued eccentric with respect to its internal diameter by a factor equal to the eccentricity created by the ball-bearings of different diameters in the ball-bearing travel circuits.

28. An element according to claim 1 or 27, characterised in that the sleeve is fixed relative to the ball-race.

29. An element according to claim 27, characterised in that the sleeve is fixed relative to the ballrace so as to eliminate the eccentricity created by the ball-bearings of different diameters in the circuits.

* * * * *